March 17, 1936.          P. B. REEVES                2,034,666
                          LUBRICATOR
                       Filed Jan. 9, 1932
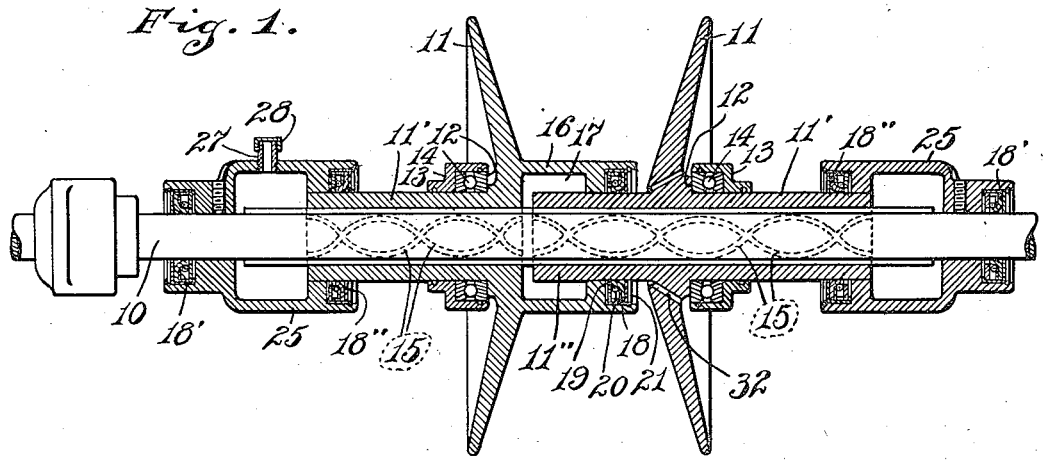
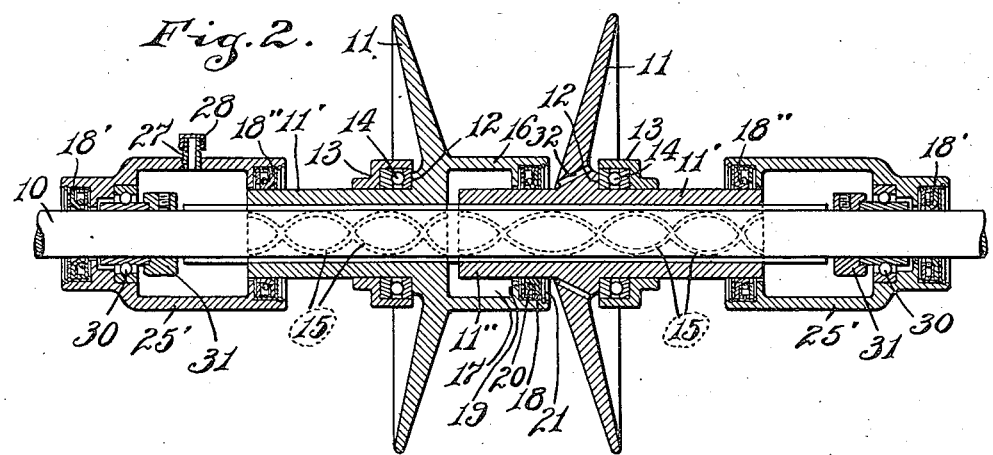
INVENTOR.
Paul B. Reeves,
BY
Hood + Hahn.
ATTORNEYS Patented Mar. 17, 1936

2,034,666

UNITED STATES PATENT OFFICE 2,034,666

LUBRICATOR

Paul B. Reeves, Columbus, Ind., assignor to Reeves Pulley Company, Columbus, Ind., a corporation of Indiana Application January 9, 1932, Serial No. 585,679

6 Claims. (Cl. 74—230.17)

In the operation of speed-varying mechanisms of the well-known "Reeves type", in which there are pairs of axially shiftable friction cones with an interposed edge-active belt, difficulty has been experienced in maintaining proper lubrication to facilitate the axial shifting of the cones upon a shaft to which they are splined.

The specific object of my present invention is to produce a construction which will insure proper lubrication of such cone elements, but it will be readily understood that the invention may be applicable in other mechanisms where there are two oppositely shiftable splined elements which require lubrication.

The accompanying drawing illustrates my invention.

Fig. 1 is an axial section of an embodiment of my invention in connection with a pair of friction cones of speed-varying mechanism of the type mentioned above, the lubricating structure being independent of the shaft bearings, and Fig. 2 is a similar section of another form in which my improved lubricating means is coordinated with the shaft bearings.

In Fig. 1 of the drawing 10 indicates a shaft upon which are splined two friction cones 11, 11. Each of these cones is supported by a hub or sleeve 11′ flanked at its inner end by a shoulder 12, and journaled on the hub is a pressure collar 13 with a thrust bearing 14 interposed between the pressure collar and the adjacent shoulder 12.

The bores of hubs 11′ are provided with tortuous channels 15, for the distribution of the lubricant through the lengths of the hubs 11′. One of the cones is provided with a hub or sleeve 11″ which projects toward the adjacent cone and has a diameter and radial dimension equal to the diameter and radial dimension of hub 11′. The other cone is provided with a cup flange 16 which telescopes over the hub 11″ and has an internal diameter sufficiently greater than the external diameter of hub 11″ to form a lubricant-containing pocket 17. The axial extent of cup 16 is somewhat greater than the permissible relative axial movement of the two cones and the mouth of the cup, surrounding hub 11″ is sealed preferably by a flexible annular sealing element 18 carried by an annular carrier and having an inwardly presented lip 19 which is yieldingly urged toward the periphery of hub 11′ by a spring retainer 20, this sealing structure being one common and well-known. The carrier containing the sealing annulus is held in place by a removable snap ring 21 sprung within the mouth of cup 16.

Secured to shaft 10 at the outer end of each hub 11′ and telescoping thereover is a cup 25 the internal dimension of which is greater than the diameter of hub 11′ and the depth of which is greater than the axial movement of the expected axial movement of hub 11′ on shaft 10. Each cup 25 is packed, at its junction with shaft 10, by a packing 18′ similar to the packing ring 18, and the mouth of each cup 25 is packed around the adjacent hub 11′ by a packing 18″. One of the cups 25 is provided with a supply nipple 27 which may be tightly capped by cap 28. In operation the cavities of cups 25, 25, chamber 17 and the grooves 15, which are extended so as to communicate with the interiors of cups 25, 25 are filled with desirable lubricant. Movement of the cones toward each other will reduce the capacity of chamber 17 and, as such movement will retract the outer ends of hubs 11′ from their respective cups 25, 25, the capacities of cups 25, 25 will be correspondingly increased so that, lubricant forced from cavity 17 will be driven through grooves 15 toward cups 25. Movement of cones 11 away from each other will increase the capacity of chamber 17 but such movement will be accompanied by projections of the outer ends of hubs 11′ into their respective associated cups 25, 25, reducing the capacity of said cups as the capacity of chamber 17 is increased, so that the lubricant will be driven from cups 25, 25 into chamber 17.

Pressure induced in chamber 17 and cups 25, 25 by reciprocations of the cones on the shaft will tighten the packings 18, 18′ and 18″ and the forced surging of the lubricant through the channels 15 will insure proper lubrication of the cones on the shaft to facilitate the axial shifting of said cones on the shaft.

In the form shown in Fig. 2 the part 25′, which takes the place of part 25 in Fig. 1 is provided with a bearing 30 in which the shaft is journaled. Part 25′, therefore, instead of being secured to the shaft, is attached to, or forms a part of, a supporting frame (not shown). Axial movement of the shaft is prevented or limited by a thrust collar 31.

It will be understood, of course, that forms of packing other than the one shown may be used for sealing the chamber 17 and cups 25 without departing from my invention.

Any leakage past the packing 18 of chamber 17 will be thrown out through passages 32.

I claim as my invention:

1. The combination of a shaft, an axially slidable element sleeved on said shaft, two lubricant chambers arranged at opposite ends of said axially shiftable element and communicating with the bore of said element, said element projecting beyond the peripheries of said chambers, and means synchronized with said axially shiftable element and coordinated with said chambers by which axial movement of said axially shiftable element reversely varies the capacities of said lubricant chambers.

2. The combination of a shaft, two oppositely axially shiftable elements slidably sleeved on said shaft, three lubricant chambers arranged one between said axially shiftable elements and the other two at the opposite ends of said axially shiftable elements, said three lubricant chambers communicating with each other through the bores of said axially shiftable elements, and means synchronized with said axially shiftable elements and coordinated with said lubricant chambers whereby the capacities of the intermediate chamber on one hand, and the end chambers on the other hand will be inversely varied upon opposite axial movement of said axially shiftable elements.

3. The combination of a shaft, two lubricant cups secured to said shaft facing each other, two axially shiftable elements slidably mounted on said shaft between said cups and each provided with a hub telescopically associated in an oil-tight manner with the adjacent lubricant cup, said axially shiftable elements having telescopically associated elements forming an externally oil-tight lubricant chamber intermediate said elements.

4. The combination of a shaft, two axially-fixed lubricant cups coordinated with said shaft facing each other, two axially shiftable elements slidably mounted on said shaft between said cups and each provided with a hub telescopically associated in an oil-tight manner with the adjacent lubricant cup, said axially shiftable elements having telescopically associated elements forming an externally oil-tight lubricant chamber intermediate said elements.

5. The combination of a shaft, an axially slidable element sleeved on said shaft, two lubricant chambers arranged at opposite ends of said axially shiftable element, said element projecting beyond the peripheries of said chambers, and communicating with the bore of said element, and means moving with said element and enterable in said respective chambers, the degree of entrance of said means into their respective chambers being reversely variable by axial movement of said element.

6. The combination of a shaft, an axially slidable element sleeved on said shaft, a lubricant chamber, a second lubricant chamber moving with said element and separated from said first chamber by said element, means moving with said element and enterable in said first chamber, and other means enterable in said second chamber, the degree of entrance of said means into their respective chambers being reversely variable by axial movement of said element.

PAUL B. REEVES.

CERTIFICATE OF CORRECTION.

Patent No. 2,034,666. March 17, 1936.

PAUL B. REEVES.

It is hereby certified that error appears in the printed specification of the above numbered patent requiring correction as follows: Page 2, second column, lines 14 and 15, claim 5, strike out the words and comma "said element projecting beyond the peripheries of said chambers," and insert the same after the comma following "element" in line 16, same claim; and that the said Letters Patent should be read with this correction therein that the same may conform to the record of the case in the Patent Office.

Signed and sealed this 14th day of April, A. D. 1936.

(Seal)

Leslie Frazer
Acting Commissioner of Patents.